United States Patent
Koenig et al.

(10) Patent No.: US 10,790,716 B2
(45) Date of Patent: Sep. 29, 2020

(54) LAYERED CONDUCTORS FOR REDUCED EDDY LOSS

(71) Applicant: Hamilton Sundstrand Corporation, Charlotte, NC (US)

(72) Inventors: Andreas C. Koenig, Rockford, IL (US); Dhaval Patel, Loves Park, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 153 days.

(21) Appl. No.: 15/349,275

(22) Filed: Nov. 11, 2016

(65) Prior Publication Data
US 2018/0138769 A1 May 17, 2018

(51) Int. Cl.
| | |
|---|---|
| *H02K 3/12* | (2006.01) |
| *H02K 1/16* | (2006.01) |
| *H02K 1/26* | (2006.01) |
| *H02K 3/02* | (2006.01) |

(52) U.S. Cl.
CPC ............... *H02K 3/12* (2013.01); *H02K 1/165* (2013.01); *H02K 1/265* (2013.01); *H02K 3/02* (2013.01)

(58) Field of Classification Search
CPC ............ H02K 15/04; H02K 3/02; H02K 3/24; H02K 3/30; H02K 3/34; H02K 3/12; H02K 1/16; H02K 1/26
See application file for complete search history.

(56) References Cited

U.S. PATENT DOCUMENTS

| | | | | | |
|---|---|---|---|---|---|
| 3,408,516 | A | * | 10/1968 | Kudlacik | H02K 3/12 310/195 |
| 6,492,757 | B2 | * | 12/2002 | Nakamura | H02K 3/34 310/179 |
| 6,498,415 | B1 | * | 12/2002 | Emery | H02K 3/40 174/120 R |

(Continued)

FOREIGN PATENT DOCUMENTS

| | | |
|---|---|---|
| EP | 2953245 | 12/2015 |
| GB | 1316256 | 5/1973 |
| WO | WO-2014/041408 | 3/2014 |

OTHER PUBLICATIONS

Extended European Search Report dated Mar. 8, 2018 issued during the prosecution of European Patent Application No. 17201437.5 (10 pages).

*Primary Examiner* — Tran N Nguyen
*Assistant Examiner* — Leda T Pham
(74) *Attorney, Agent, or Firm* — Locke Lord LLP; Scott D. Wofsy; Joshua L. Jones

(57) ABSTRACT

An electrical machine includes a stator defining a plurality of circumferentially spaced slots. A layered conductor is wound into the slots. The layered conductor includes a plurality of layers wherein at least two adjacent layers in the plurality of layers have electrical conductivities that are different from one another. The at least two adjacent layers can form an interface therebetween that is tangentially aligned with a circumferential direction around the stator. The at least two adjacent layers can be in electrical communication with one another with no intervening insulator therebetween. One of the at least two adjacent layers can include a relatively high electrical conductivity metal, and another one of the at least two adjacent layers can include a relatively low electrical conductivity metal.

12 Claims, 1 Drawing Sheet

(56) References Cited

U.S. PATENT DOCUMENTS

| | | | |
|---|---|---|---|
| 6,836,047 B1* | 12/2004 | Leijon | H02K 3/34 |
| | | | 174/DIG. 20 |
| 9,196,392 B2 | 11/2015 | Hasegawa | |
| 9,461,527 B2* | 10/2016 | Patel | H02K 3/12 |
| 2005/0218746 A1* | 10/2005 | Fukasaku | H02K 15/06 |
| | | | 310/208 |
| 2014/0191610 A1 | 7/2014 | Hasegawa | |
| 2014/0300239 A1* | 10/2014 | Takizawa | H02K 3/12 |
| | | | 310/208 |
| 2015/0244233 A1* | 8/2015 | Hattori | H02K 3/12 |
| | | | 310/201 |
| 2016/0036277 A1 | 2/2016 | Lynch et al. | |

\* cited by examiner

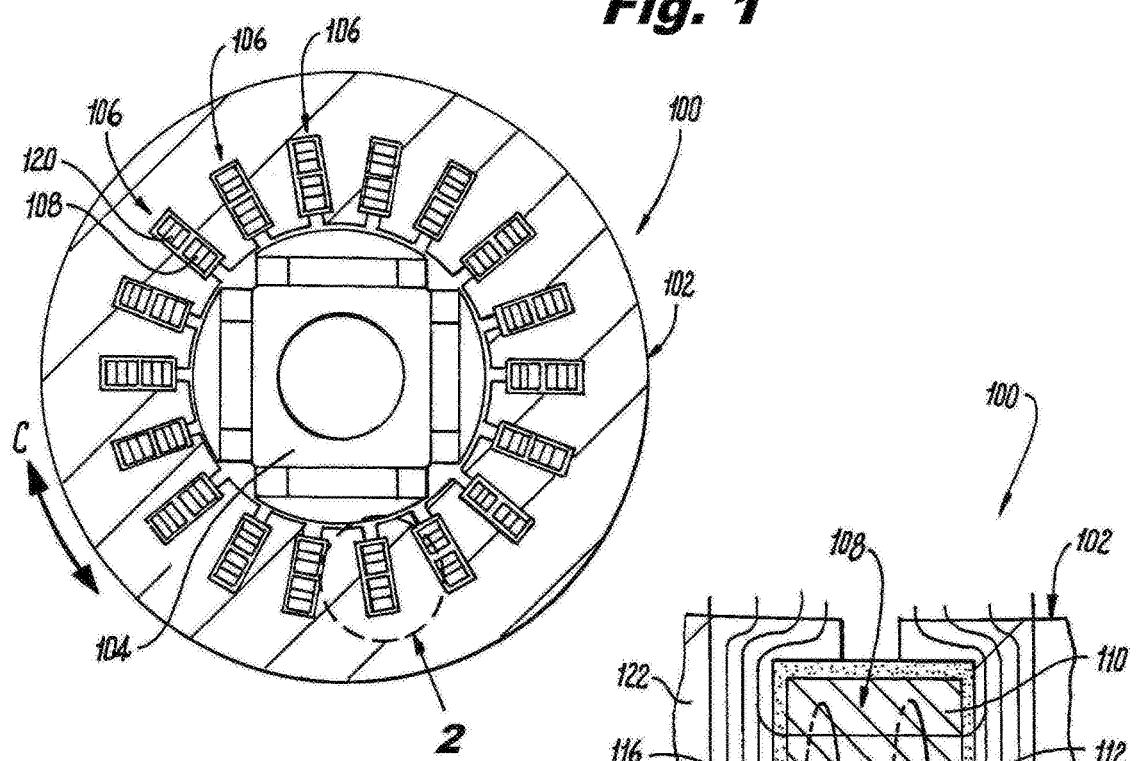
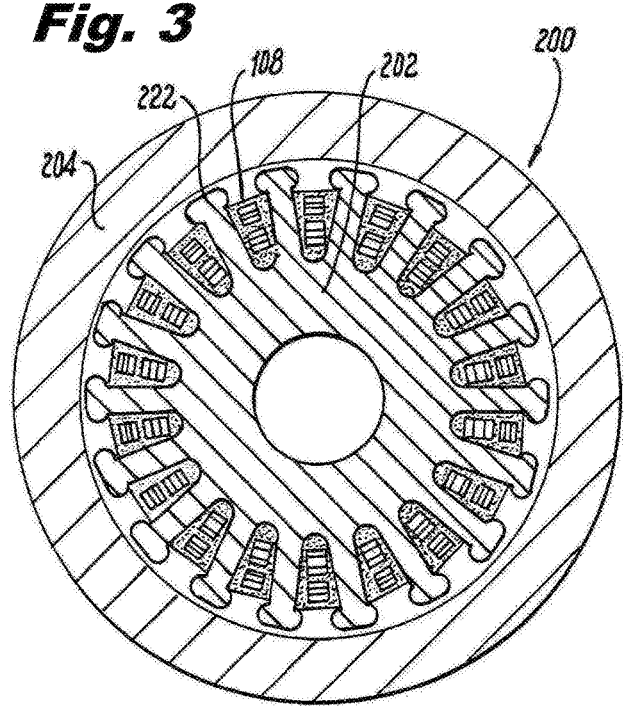
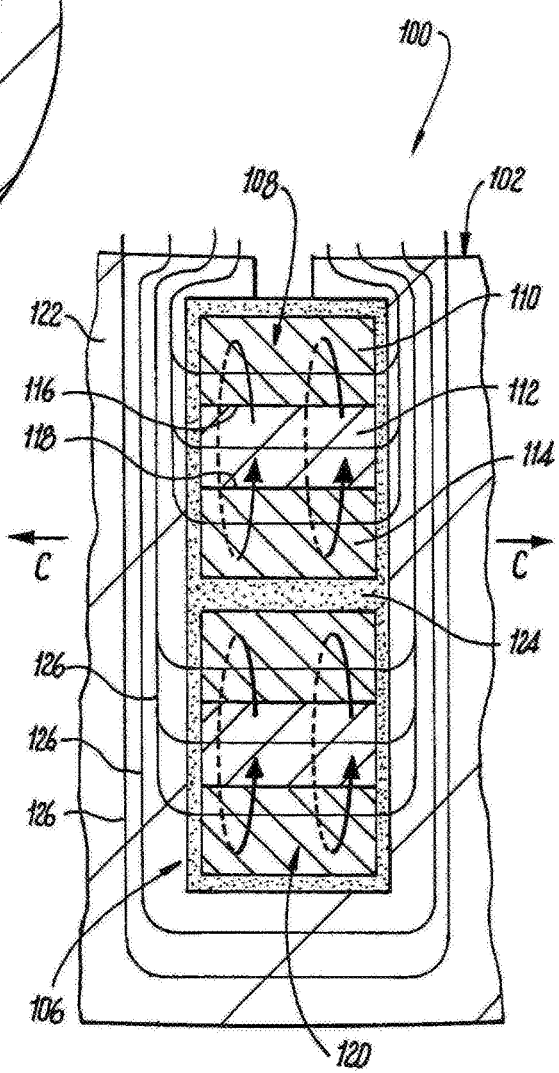

LAYERED CONDUCTORS FOR REDUCED EDDY LOSS

BACKGROUND OF THE INVENTION

1. Field of the Invention

The present disclosure relates to conductors for electrical machines and the like, and more particularly to reducing eddy losses in such conductors.

2. Description of Related Art

For high power generators and motors it is common to wind the main stator of the machine with rectangular wire. The stator is made up of magnetic steel which directs magnetic flux within the machine. Within the magnetic steel there are slots in which conductors are installed, the purpose of which is to carry electrical current. The magnetic steel does not do a perfect job carrying the magnetic flux and some flux leaks across the slots to the adjacent steel. When this occurs, the flux induces eddy currents which flow in the conductor skin but do not add to the function of the generator or motor, rather the eddy currents decrease efficiency.

In conventional generators, for example, large rectangular conductors are installed in the stator slots to maximize the amount of conductor and current passing in the slots. However, these conductors are so large that eddy currents flow in the conductors orthogonal to the direction of flux leakage. This eddy current reduces the efficiency of the generator.

One conventional way of mitigating such eddy losses is to break the conductors up and use multiple smaller conductors in place of each. Unfortunately, this reduces the total amount of conductor that can be placed in a given slot, since the conductors need to be electrically isolated from one another, e.g., by an insulator taking up space in the slot, so the power/efficiency is still limited even though the eddy losses are mitigated.

The conventional techniques have been considered satisfactory for their intended purpose. However, there is an ever present need for improved conductors for electrical machines and the like. This disclosure provides a solution for this problem.

SUMMARY OF THE INVENTION

A generator includes a stator defining a plurality of circumferentially spaced slots. A layered conductor is wound into the slots. The layered conductor includes a plurality of layers wherein at least two adjacent layers in the plurality of layers have electrical conductivities that are different from one another.

The at least two adjacent layers can form an interface therebetween that is tangentially aligned with a circumferential direction around the stator. The at least two adjacent layers can be in electrical communication with one another with no intervening insulator therebetween. One of the at least two adjacent layers can include a relatively high electrical conductivity metal including at least one of Copper, Gold, or Silver, and another one of the at least two adjacent layers can include a relatively low electrical conductivity metal including at least one of Nickel, Aluminum, Platinum, Zinc, or Tin. At least two adjacent layers can include a radially inner layer of a relatively high electrical conductivity material, a middle layer of a relatively low electrical conductivity material, and a radially outer layer of a relatively high electrical conductivity material. The layered conductor can be a radially inner layered conductor. A radially outer layered conductor can be wound in each slot of the stator outboard of the radially inner layered conductor, wherein the radially outer layered conductor includes a plurality of layers as described above.

An electrical machine includes a teeth component defining a plurality of circumferentially spaced slots between teeth and a layered conductor as described above wound into the slots. The teeth component can be a rotor, either radially outward of or radially inward of a stator. It is also contemplated that the teeth component can be a stator either radially outward of or radially inward of a rotor. Two layered conductors as described above can separated from one another and from the teeth by an insulator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic cross-sectional end view of an exemplary embodiment of an electrical machine constructed in accordance with the present disclosure, showing the stator slots;

FIG. 2 is a schematic cross-sectional end view of a portion of the electrical machine of FIG. 1, showing the layered conductors; and FIG. 3 is a schematic cross-sectional end view of another exemplary embodiment of an electrical machine constructed in accordance with the present disclosure, showing layered conductor windings in a radially inner stator or rotor.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 100. Other embodiments of electrical machines in accordance with the disclosure, or aspects thereof, are provided in FIGS. 2-3, as will be described. The systems and methods described herein can be used to reduce eddy losses and/or improve slot space utilization compared to conventional techniques.

Electrical machine 100, e.g., a generator, includes a stator 102 radially outboard of a rotor 104. The stator 102 defines a plurality of circumferentially spaced slots 106, only some of which are identified with reference characters in FIG. 1 for sake of clarity. A layered conductor 108 is wound into the slots 106. FIG. 2 shows one of the slots 106 in greater detail. The layered conductor 108 includes a plurality of layers 110, 112, and 114. Layer 110 is a radially inner layer of a relatively high electrical conductivity material, layer 112 is a middle layer of a relatively low electrical conductivity material, and layer 114 is a radially outer layer of a relatively high electrical conductivity material. For example, layers 110 and 114 can be made of a relatively high electrical conductivity metal including at least one of Copper, Gold, or Silver, and layer 112 can be made of a relatively lower electrical conductivity metal including at least one of Nickel, Aluminum Platinum, Zinc, or Tin.

There is an interface 116 formed between layers 110 and 112, and another interface 118 formed between layers 114 and 112. Each of the interfaces 116 and 118 is tangentially aligned with, i.e. tangent to, a circumferential direction C around the stator 102. These interfaces 116 and 118 can be formed, for example, by a rolling process that squeezes layers 110, 112, and 114 together at the interfaces 116 and 118 for high pressure bonding that gives intimate, electrically conductive contact between layers 110 and 112 and between layers 112 and 114. Each interface 116, 118 extends from electrical insulation on a first side of the slot 106 to electrical insulation on a second side of the slot 106 opposite the first side. Thus layers 110, 112, and 114 are in electrical communication with one another with no intervening insulator therebetween.

The magnetic flux lines 126 are schematically indicated in FIG. 2, and the looping arrows in FIG. 2 schematically indicate the direction of eddy currents in conventional windings, where the dotted portions of the eddy current arrows are behind the plane of cross-section in FIG. 2, to schematically indicate the eddy current direction is actually into and out of the plane of cross-section in FIG. 2. While the direction of the conventional eddy currents is illustrated schematically in FIG. 2, the currently disclosed embodiments reduce the magnitude of eddy currents when compared to conventional windings. The interfaces 116 and 118 are perpendicular to the direction of eddy current indicated by the looping arrows in FIG. 2, and are parallel to the direction of the leakage magnetic field through slot 106, as indicated by the magnetic flux lines 126.

The layers 110, 112, and 114 create anisotropic electrical conductivity, i.e., the overall electrical conductivity in the winding direction (into and out of the plane or paper of FIG. 2) is higher than the overall electrical conductivity in the radial direction (the vertical direction in FIG. 2). Thus, the electrical conductivity in the desired direction for current is higher than in the direction for unwanted eddy current. At the same time, the slot 106 can be highly optimized, e.g. filled to a maximum extent with conductor material. This also provides for simplified winding compared to conventional configurations, given the easier handling involved and winding of the wire with fewer conductors per slot than in conventional configurations with segmented conductors.

The layered conductor 108 is a radially inner layered conductor. A second, radially outer layered conductor 120 is wound in each slot 106 of the stator 102 outboard of the radially inner layered conductor 108, wherein the radially outer layered conductor includes a plurality of layers as described above with respect to layered conductor 108. The layered conductors 108 and 120 are separated from one another and from the teeth 122 of stator 102 by an insulator 124.

The interfaces 116 and 118 between materials of two different electrical conductivities mitigate the flow of current in the eddy current direction, reducing eddy losses. However, unlike in conventional configurations with insulation between each winding, the lower conductivity material, e.g., of layer 112, conducts a significant amount of current in the winding direction. So the slot area is utilized more fully in stator 102 than in conventional configurations with insulators separating multiple conductors.

While shown and described in the exemplary context of a generator, those skilled in the art will readily appreciate that the layered conductors described herein can readily be applied to motors or other electrical machines without departing from the scope of this disclosure. Moreover, while shown and described in the exemplary context of a stator 102 radially outboard of a rotor 104, as shown in FIG. 1, those skilled in the art will readily appreciate that layered conductors as described herein can readily be used in a radially outward rotor, or in radially inward teeth components, i.e. rotors or stators, without departing from the scope of this disclosure. For example, FIG. 3 shows component 202, including a plurality of teeth 222, radially inward of an outer stator or rotor 204 in an electrical machine 200, with a layered conductor 108 as described above wound in the slots 206 between teeth 222. While shown and described in the exemplary context of conductors with three layers, those skilled in the art will readily appreciate that any suitable number of layers can be used, including two, or more than three, without departing from the scope of this disclosure.

The methods and systems of the present disclosure, as described above and shown in the drawings, provide for electrical machine windings with superior properties including reduced eddy losses and/or better utilization of slot space than conventional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A generator comprising:
   a stator defining a plurality of circumferentially spaced slots; and
   a layered conductor wound into the slots, wherein the layered conductor includes a plurality of layers wherein at least two adjacent layers in the plurality of layers have electrical conductivities that are different from one another, wherein the at least two adjacent layers form an interface therebetween that is tangentially aligned with a circumferential direction around the stator, wherein the interface extends from electrical insulation on a first side of the slot to electrical insulation on a second side of the slot opposite the first side, wherein the layered conductor is a radially inner layered conductor, and further comprising a radially outer layered conductor wound in each slot of the stator outboard of the radially inner layered conductor, wherein the radially outer layered conductor includes a plurality of layers wherein at least two adjacent layers in the plurality of layers have electrical conductivities that are different from one another, wherein the inner and outer layered conductors are separated from one another and from a teeth component by an insulator, wherein the at least two adjacent layers are in electrical communication with one another with no intervening insulator therebetween.

2. The generator as recited in claim 1, wherein one of the at least two adjacent layers includes a first electrical conductivity metal, and wherein another one of the at least two adjacent layers includes a lower electrical conductivity metal relative to the first electrical conductivity metal.

3. A generator comprising:
   a stator defining a plurality of circumferentially spaced slots; and
   a layered conductor wound into the slots, wherein the layered conductor includes a plurality of layers wherein at least two adjacent layers in the plurality of layers have electrical conductivities that are different from one another, wherein the at least two adjacent layers form an interface therebetween that is tangentially aligned with a circumferential direction around the stator, wherein the interface extends from electrical insulation on a first side of the slot to electrical insulation on a second side of the slot opposite the first side, wherein the layered conductor is a radially inner layered conductor, and further comprising a radially outer layered conductor wound in each slot of the stator outboard of the radially inner layered conductor, wherein the radially outer layered conductor includes a plurality of layers wherein at least two adjacent layers in the plurality of layers have electrical conductivities that are different from one another, wherein the inner and outer layered conductors are separated from one another and from a teeth component by an insulator wherein the at least two adjacent layers include three adjacent layers, namely a radially inner layer of a first electrical conductivity material, a middle layer of a lower electrical conductivity material than the first electrical conductivity material, and a radially outer layer of an electrical conductivity material with an electrical conductivity higher than the lower electrical conductivity material.

4. An electrical machine comprising:
a teeth component defining a plurality of circumferentially spaced slots between teeth; and
a layered conductor wound into the slots, wherein the layered conductor includes a plurality of layers wherein at least two adjacent layers in the plurality of layers have electrical conductivities that are different from one another, wherein the at least two adjacent layers form an interface therebetween that is tangentially aligned with a circumferential direction around the teeth component, wherein the interface extends from electrical insulation on a first side of each slot to electrical insulation on a second side of the slot opposite the first side, wherein the layered conductor is a radially inner layered conductor, and further comprising a radially outer layered conductor wound in each slot of the stator outboard of the radially inner layered conductor, wherein the radially outer layered conductor includes a plurality of layers wherein at least two adjacent layers in the plurality of layers have electrical conductivities that are different from one another, wherein the inner and outer layered conductors are separated from one another and from the teeth component by an insulator, wherein the at least two adjacent layers are in electrical communication with one another with no intervening insulator therebetween.

5. The electrical machine as recited in claim 4, wherein the teeth component is a rotor.

6. The electrical machine as recited in claim 5, wherein the rotor is radially outward of a stator.

7. The electrical machine as recited in claim 5, wherein the rotor is radially inward of a stator.

8. The electrical machine as recited in claim 4, wherein the teeth component is a stator.

9. The electrical component as recited in claim 8, wherein the stator is radially outward of a rotor.

10. The electrical machine as recited in claim 8, wherein the stator is radially inward of a rotor.

11. The electrical machine as recited in claim 4, wherein one of the at least two adjacent layers includes a first electrical conductivity metal, and wherein another one of the at least two adjacent layers includes a lower electrical conductivity metal relative to the first electrical conductivity metal.

12. An electrical machine comprising:
a teeth component defining a plurality of circumferentially spaced slots between teeth; and
a layered conductor wound into the slots, wherein the layered conductor includes a plurality of layers wherein at least two adjacent layers in the plurality of layers have electrical conductivities that are different from one another, wherein the at least two adjacent layers form an interface therebetween that is tangentially aligned with a circumferential direction around the teeth component, wherein the interface extends from electrical insulation on a first side of each slot to electrical insulation on a second side of the slot opposite the first side, wherein the layered conductor is a radially inner layered conductor, and further comprising a radially outer layered conductor wound in each slot of the stator outboard of the radially inner layered conductor, wherein the radially outer layered conductor includes a plurality of layers wherein at least two adjacent layers in the plurality of layers have electrical conductivities that are different from one another, wherein the inner and outer layered conductors are separated from one another and from the teeth component by an insulator wherein the at least two adjacent layers include three adjacent layers, namely a radially inner layer of a first electrical conductivity material, a middle layer of a lower electrical conductivity material than the first electrical conductivity material, and a radially outer layer of an electrical conductivity material with an electrical conductivity higher than the lower electrical conductivity material.

* * * * *